United States Patent [19]

Bittner et al.

[11] 3,959,180

[45] May 25, 1976

[54] METHOD FOR CATALYST PREPARATION

[75] Inventors: Clarence W. Bittner, Orinda; Walter G. Schlaffer, San Francisco, both of Calif.

[73] Assignee: Shell Oil Company, Houston, Tex.

[22] Filed: Jan. 23, 1975

[21] Appl. No.: 543,590

[52] U.S. Cl. .......................... 252/455 Z; 252/458; 252/459
[51] Int. Cl.² ................ B01J 29/06; B01J 29/00; B01J 29/10
[58] Field of Search .................. 252/455 Z, 458

[56] References Cited

UNITED STATES PATENTS

| | | | |
|---|---|---|---|
| 3,013,987 | 12/1961 | Castor et al. | 252/455 Z |
| 3,013,988 | 12/1961 | Bukata et al. | 252/455 Z |
| 3,013,990 | 12/1961 | Breck et al. | 252/455 Z |
| 3,694,345 | 9/1972 | Bittner | 208/111 |

*Primary Examiner*—Carl F. Dees
*Attorney, Agent, or Firm*—Ronald R. Reper

[57] ABSTRACT

A method is disclosed for preparing nickel-containing crystalline aluminosilicate catalysts particularly useful in hydrocracking processes.

8 Claims, No Drawings

METHOD FOR CATALYST PREPARATION

BACKGROUND OF THE INVENTION

1. Field of the Invention

This invention relates to preparation of hydrocarbon conversion catalysts comprising nickel-containing aluminosilicates. More particularly it relates to preparation of a zeolite-based catalyst of low alkali metal content comprising a relatively high percentage of nickel and a relatively low percentage of Group VI-B hydrogenation metal components, which catalyst is particularly useful in a hydrocracking process.

The instant invention is particularly useful for the preparation of hydrocracking catalysts described in U.S. Pat. No. 3,694,345 to Bittner and incorporated herein by reference.

2. Description of Prior Art

Conventionally, hydrogenation metal components are composited with a zeolite carrier by any of the techniques known in the art such as ion exchange and/or impregnation. A difficulty with the ion exchange procedure when seeking comparatively high nickel loadings on the zeolite is that multiple exchanges may be required, rendering this procedure time-consuming and laborious for commercial production. Impregnation has been suggested, however, this procedure often requires multiple impregnating steps since it is usually exceedingly difficult, and often impossible to prepare impregnating solutions of sufficiently high concentration so as to uniformly incorporate the desired amount of metal, in one step without undue precipitation of the metals and/or agglomeration of the zeolite.

SUMMARY OF THE INVENTION

It has now been discovered that a zeolitic catalyst having a silica:alumina molar ratio between about 2 and 10, a nickel content of 15–30%w, and a Group VI-B metal content of 0.05–6%w may be prepared by a method comprising:

A. Heating a solid hydrated nickel salt of a strong inorganic acid to a temperature sufficient to cause the solid to form a solution of said salt in its own water of crystallization,
B. Dissolving in said solution a tungsten salt in an amount sufficient to provide a ratio of nickel atoms to tungsten atoms in the range from about 8:1 to 2000:1,
C. Contacting at a temperature from about 60° to about 110°C sufficient of the product of step B with calcined stabilized zeolite so as to fill the available pore volume thereby forming a composited zeolite,
D. Drying the composited zeolite, and
E. Calcining the composite at a temperature from about 400° to 650°C for at least 30 minutes.

If zeolite powder is used in the invention, the impregnated zeolite would be mixed with a suitable binder, e.g. alumina, or clay, after Step C, D, or E, and formed into suitable particles, e.g. by extrusion, followed by calcination as in Step D.

The method of the invention results in hydrocracking catalysts having not only excellent hydrocracking characteristics, but surprisingly improved crush strength when preformed extrudates are used: finished catalysts according to the invention have crush strengths substantially higher than the starting extrudates.

DESCRIPTION OF PREFERRED EMBODIMENTS

Crystalline aluminosilicates suitably employed in the process of the invention include both natural and synthetic crystalline zeolites. The natural zeolites include, for example, faujasite and mordenite. The synthetic zeolites, which are much preferred, include, for example those of the mordenite, Y, and L structural types, which materials have a silica:alumina ratio between about 2 and 10. Zeolite Y is structurally related to the mineral faujasite as evidenced by x-ray diffraction. While natural faujasite has a silica:alumina molar ratio of about 4.4 synthetic zeolite Y products may be prepared with molar ratios varying between about 3 and 6. The most suitable and preferred aluminosilicates are zeolites of the Y-class, the preparation of which is well known and described in U.S. Pat. No. 3,130,007.

Synthetic faujasites as customarily prepared typically contain in the range of about 10–13%w sodium oxide. Exchange of the sodium for hydrogen ion has long been recognized as a means for markedly improving catalytic activity. Preferably the aluminosilicates employed in the present invention will have a low alkali metal or alkaline earth content. This can be accomplished for example by ion-exchanging the alkali metal or alkaline earth ions originally present in either the synthetic or natural zeolitic base with monovalent ions such as silver, polyvalent ions such as aluminum, or those of the rare earths, or with ammonium ions. By calcination, the ammonium form is converted to the hydrogen form. The hydrogen form of the zeolite is particularly preferred. Particularly preferred are special hydrogen zeolites known as "stabilized" Y zeolites. These zeolites, which exhibit thermal stability at temperatures up to 1000°C and more, may be prepared as described by C. V. McDaniel and P. K. Maher in the proceedings of the Conference on Molecular Sieves, London England, April 4–6, 1967, pp. 186–195. The zeolites may be employed as powder or formed particles, however, preferably calcined bound preforms are used such as extrudates or pellets with a minor amount e.g. less than 40%w and preferably 25%w or less of a binder such as clay or alumina.

The hydrated water soluble nickel salts employed according to the invention are salts of strong inorganic acids i.e. acids having greater acidity than a pka of 1, such as nitric acid and hydrochloric acid. Exemplary salts include, for example nickel nitrate hexahydrate, nickel nitrate pentahydrate, nickel chloride hexahydrate, nickel chlorate hexahydrate and nickel perchlorate hexahydrate. Generally speaking the chlorates and perchlorates are less suitable owing to the risk of violent decomposition. Preferred are the hydrated nickel nitrates and chlorides; and most preferred is nickel nitrate hexahydrate which has been found to readily dissolve in its own water of crystallization at temperatures on the order of about 57°C. In the interest of expediting dissolution of the salt, minor amounts of solubilizing liquids e.g. up to about 10%w water or hydrogen peroxide may be added to the viscous solution nickel salt prepared from the water of crystallization. However, best results are obtained when the final salt concentration is at least about 5 molar.

Any tungsten compound which is adequately soluble in the acidic solution of the nickel salt may be used. Generally speaking salts of tungstic acid have been found most suitable, particularly ammonium salts such as ammonium metatungstate, ammonium paratungstate and the like. Additional tungsten compounds include ammonium thiotungstate, tungsto silicic acid, ammonium tungstosilicate and ammonium tungophosphate. The quantity of tungsten in solution may vary within wide limits, and amounts sufficient to provide an atomic ratio of nickel to tungsten in the range from about 8:1 to about 2000:1 and preferably from about 10 to about 300 may be employed.

Generally speaking the zeolite may be contacted with the composite solution at any temperature above the solidification point of the solution to its boiling temperature. Temperatures in the range from about 75 to about 110°C may be used, although temperatures above about 100°C require elevated pressure and still higher temperatures may be employed at greatly elevated pressure, if desired. The preferred temperature range is from about 85° to 105°C.

The amount of composite solution contacted with the zeolite should generally correspond to approximately ±10 PCV of the total available pore volume of the zeolite carrier. It is preferred that the total volume of composite solution should not exceed by about five percent and more preferably less than by about 2 percent the total available pore volume to assure incorporation of the desired metal content and avoid undue agglomeration of the zeolite.

The total available pore volume of the aluminosilicate carrier may be determined by a simple water absorption method. The silicate is first dried to constant weight in a suitable oven or furnace. The zeolite is then immersed in water at ambient temperature, drained of excess water for about 10 minutes and reweighed. The weight of the sorbed water may then be converted to the volume sorbed into the pores of the zeolite by dividing by the density of water at the temperature of measurement.

The contacting time will vary according to the particular materials and conditions employed, however, contacting periods from one to ten hours and particularly from about two to seven hours will be sufficient in the preferred temperature range. Ordinarily the contacting should be conducted in equipment made of corrosion resistant materials such as stainless steel since the solutions will be strongly acidic, for example, when employing nickel nitrate hexahydrate a pH of about 2.4 was found for the resulting solution. It is quite surprising that in view of the low pH of these solutions that the crush strength of preformed particles of zeolite carrier was not impaired. It was entirely unexpected that the crush strength of the final catalyst prepared according to the invention employing calcined preformed zeolites bound with minor amounts (up to 25%w) of binder such as clay or alumina was considerably higher than the starting material.

After incorporation of substantially all the nickel-tungsten salt solution into the zeolite the composited material is dried e.g. at 100°–200°C and calcined in an oxygen containing environment such as air at a temperature from about 400° to 650°C. Suitable calcination times are from about 30 minutes to 24 hours, preferably from about 2 to 16 hours.

The catalysts produced according to the invention are very suitably employed in either simple or multistage hydrocracking processes. The catalysts are preferably used in the form of discrete particles such as granules, extrudrates, pellets and the like, usually ranging in size from about 1/32 inch to about one-fourth inch in average diameter.

Suitable feedstocks for hydrocracking processes employing these catalysts include any hydrocarbon distillate boiling above the range of the desired products. For gasoline production, hydrocarbon distillates boiling in the range from about 200° to 510°C are suitable. Operating conditions appropriate for a hydrocracking process employing catalysts prepared according to the invention include temperatures in the range from about 260° to about 450°C, hydrogen partial pressures from about 500 to about 2000 psi, liquid hourly space velocities (LHSV) from about 0.2 to about 10 and hydrogen/oil molar ratios from about 5 to 50.

The invention is further illustrated by the following specific but not-limiting examples.

Example I

A sample of stabilized Y zeolite 1/16 inch extrudates containing 25% alumina binder was calcined at 500°C for 16 hours in a vented furnace. A 100g portion of the calcined extrudates was placed in a dry 500 ml recovery flask which was then stoppered and placed into a boiling water bath for one hour. In a second identical flask 105 g of nickel nitrate hexahydrate [$Ni(NO_3)_2 \cdot 6H_2O$] were heated also in the boiling water bath to form a clear solution and then 3.0 g of finely pulverized ammonium metatungstate (92% $WO_3$) were sprinkled slowly into the solution with swirling. This flask was stoppered and placed in the boiling water bath for 1 hour with intermittant agitation to assure dissolution of the added tungstate.

The hot zeolite extrudates were next added to the nickel-tungsten solution and the flask again stoppered and agitated in the boiling water bath until the extrudates were uniformly wetted. The flask was then kept in the water bath for 5 hours with occasional shaking, by which time all of the solution had been sorbed and the extrudates were pale green, dry, and free flowing. Nitrogen oxides were evident in the flask.

The zeolite composites were then dried in a vented oven at 120°C for 16 hours and then calcined in a vented furnace at 500°C for 16 hours. Subsequent analysis found 20.1% nickel and 2.3% tungsten, based upon the zeolite content, uniformly distributed throughout the extrudates. The crush strength of this catalyst measured by the flat plate method was 25.1 psi compared to 18.9 psi for the zeolite starting material.

Example II

This example illustrates the difficulties encountered when attempting to impregnate the zeolite carrier with a large excess of the nickel solution. The procedure of Example I was repeated except that a larger quantity of the nickel-tungsten solution was prepared and added to the same quantity of zeolite extrudates. In this preparation the zeolite became coated with viscous liquid which would not drain off and caused the extrudates to agglomerate into large lumps. Upon calcination of this material, the film of excess solution was converted to an undesirable scaly skin of metal oxides.

What is claimed is:

1. A method for preparing a crystalline aluminosilicate zeolite catalyst having a nickel content of 15–30%w and a Group VI-B metal content of 0.05 – 6%w which method comprises
   A. Heating a solid hydrated water soluble nickel salt of a strong inorganic acid to a temperature from about 60° to about 100°C to form a solution of said salt in its own water of crystallization, B. Dissolving in said solution a tungsten compound in an amount sufficient to provide an atomic ratio of nickel to tungsten in the range of from about 8:1 to 2,000:1,
C. Contacting at a temperature from about 60° to about 110°C an amount of the product of step B corresponding to approximately ±10pcv of the total available pore volume of the zeolite with calcined stabilized zeolite having a silica:alumina molar ratio between about 2 and 10 so as to fill about the total available pore volume of said zeolite,
D. Drying the composite, and
E. Calcining the composite for at least about 30 minutes at a temperature from about 450° to 600°C.

2. A method as in claim 1 wherein the hydrated nickel salt is selected from nickel nitrate and nickel chloride.

3. A method as in claim 2 where the hydrated nickel salt is nickel nitrate hexahydrate.

4. A method as in claim 1 wherein the tungsten compound is a tungstate.

5. A method as in claim 4 wherein the tungsten compound is ammonium metatungstate.

6. A method as in claim 1 wherein the contacting temperature is from about 85° to 105°C.

7. A method as in claim 1 wherein prior to step C up to about 10%w of a solubilizing liquid selected from water, and hydrogen peroxide is added to the solution.

8. A method as in claim 1 wherein in step B an amount of tungsten compound is dissolved in said solution sufficient to provide an atomic ratio of nickel to tungsten in the range from about 10 to 300.

* * * * *